(12) United States Patent
Katoh

(10) Patent No.: US 11,444,922 B2
(45) Date of Patent: Sep. 13, 2022

(54) SYSTEM FOR DETECTING CONTROL DEVICE SECURITY MALFUNCTIONS

(71) Applicant: TOYOTA JIDOSHA KABUSHIKI KAISHA, Toyota (JP)

(72) Inventor: Yoshihiko Katoh, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 203 days.

(21) Appl. No.: 16/922,135

(22) Filed: Jul. 7, 2020

(65) Prior Publication Data

US 2021/0058372 A1 Feb. 25, 2021

(30) Foreign Application Priority Data

Aug. 21, 2019 (JP) .............................. JP2019-151515

(51) Int. Cl.
*H04L 9/40* (2022.01)
*H04L 67/12* (2022.01)
*B60W 40/105* (2012.01)

(52) U.S. Cl.
CPC ....... *H04L 63/0263* (2013.01); *B60W 40/105* (2013.01); *H04L 63/1441* (2013.01); *H04L 67/12* (2013.01)

(58) Field of Classification Search
CPC .. H04L 67/12; H04L 63/1441; H04L 63/0263
See application file for complete search history.

(56) References Cited

U.S. PATENT DOCUMENTS

| 2017/0053464 A1* | 2/2017 | Woerz ..................... H04L 12/40 |
| 2017/0093866 A1* | 3/2017 | Ben-Noon .......... H04W 12/069 |
| 2017/0180370 A1* | 6/2017 | Satoh ..................... G06F 21/565 |
| 2017/0278320 A1* | 9/2017 | Isozaki ............... G06F 13/4027 |
| 2018/0004964 A1* | 1/2018 | Litichever ......... H04L 12/40169 |
| 2018/0205703 A1* | 7/2018 | Grau ..................... G06F 21/554 |
| 2018/0359271 A1* | 12/2018 | Kneib ................. H04L 12/4625 |
| 2019/0268376 A1* | 8/2019 | Park ..................... H04L 9/0819 |
| 2019/0394089 A1* | 12/2019 | Barrett .................... H04L 67/12 |
| 2020/0326723 A1* | 10/2020 | Ayers .................. G07C 5/0808 |

FOREIGN PATENT DOCUMENTS

JP 2017-118487 A 6/2017

* cited by examiner

*Primary Examiner* — William G Trost, IV
*Assistant Examiner* — Adam A Cooney
(74) *Attorney, Agent, or Firm* — Oliff PLC

(57) ABSTRACT

A determination device includes a processor. The processor being configured to: send first information that is not conforming to a rule of a firewall to a control device, execute first determination processing in which the control device is determined to be in a malfunction state in a case in which a first notification acquired from the control device is a normal notification, and the control device is determined to be in a normal state in a case in which the first notification is an abnormal notification, additionally send second information conforming to the rule to the control device in a case in which the control device has been determined to be in a normal state, and execute second determination processing in which the control device is determined to be in a normal state in a case in which a second notification acquired from the control device is the normal notification.

7 Claims, 7 Drawing Sheets

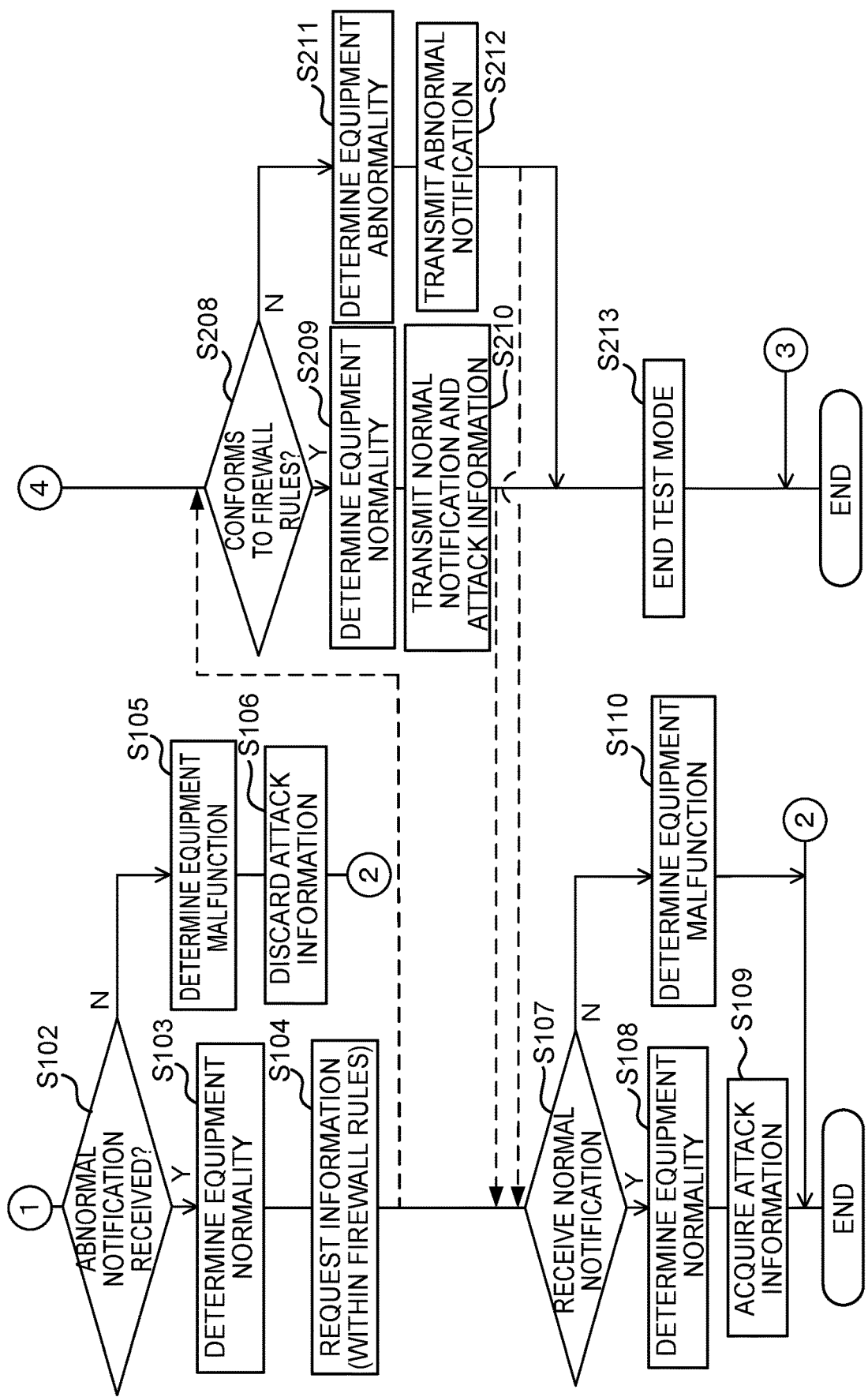

SYSTEM FOR DETECTING CONTROL DEVICE SECURITY MALFUNCTIONS

CROSS-REFERENCE TO RELATED APPLICATION

This application is based on and claims priority under 35 USC 119 from Japanese Patent Application No. 2019-151515 filed on Aug. 21, 2019, the disclosure of which is incorporated by reference herein.

BACKGROUND

Technical Field

The present disclosure relates to a determination device, a determination system, a storage medium storing a program, and a determination method.

Related Art

One conceivable method of gathering attack information relating to security attacks against an onboard LAN involves detecting such a security attack using security functionality such as message authentication, firewalls, or the like, and gathering attack information accompanying such a security attack using a central device or the like. The central device can then analyze the gathered attack information.

However, in cases in which there is a malfunction of circuits involved in message authentication or firewall, then normal communications might be falsely detected as a security attack and uploaded to the central device. This would result in increased communication costs and unnecessary expenditure of analysis resources by the central device. There is accordingly a need to verify whether or not circuits involved in message authentication and firewalls are functioning correctly.

Japanese Patent Application Laid-Open (JP-A) No. 2017-118487 discloses a method employed when gathering attack information relating to security attacks, such as unauthorized access, in which attack information is gathered in a central device only after excluding attack information that was actually generated by a circuit malfunction or the like. In this method a determination is made as to whether or not a circuit is normal based on matching or not matching a message authentication code.

However, although the method of JP-A No. 2017-118487 discloses sorting of attack information for cases in which a circuit involved in message authentication has malfunctioned, there is no consideration given to cases in which a circuit involved in a firewall has malfunctioned.

SUMMARY

An object of the present disclosure is to provide a determination device, determination system, a storage medium storing program, and determination method capable of excluding false detections arising due a control device malfunctioning in situations in which attack information relating to security attacks is gathered from a control device protecting security using a firewall.

A determination device of a first aspect includes a communication section, a first send section, a first determination section, a second send section, and a second determination section. The communication section is configured to communicate with a control device installed in a vehicle. The first send section is configured to send first information to the control device that is information not conforming to a rule of a firewall of the control device. The first determination section is configured to, when a response by the control device to the first information has been acquired from the control device as a first notification, determine the control device to be in a malfunction state in a case in which the first notification is a normal notification indicating that the control device is in a normal state, and determine the control device to be in a normal state in a case in which the first notification is an abnormal notification indicating the control device is in an abnormal state. The second send section is configured to additionally send second information conforming to the rule to the control device in a case in which the control device has been determined to be in a normal state by the first determination section. The second determination section is configured to, when a response by the control device to the second information has been acquired from the control device as a second notification, determine the control device to be in a normal in a case in which the second notification is the normal notification.

The determination device of the first aspect is configured to communicate with the control device installed in a vehicle using the communication section. First, the determination device employs the first send section to send the first information not conforming to the firewall rule of the control device, and acquires as the first notification the response from the control device to the first information. Then the determination device employs the first determination section to determine the control device to be in a malfunction state in a case in which the first notification acquired is the normal notification indicating that the control device is in a normal state, and to determine the control device to be in a normal state in a case in which the first notification acquired is the abnormal notification indicating the control device is in an abnormal state. The determination device then continues by employing the second send section to send the second information conforming to the firewall rule of the control device to the control device, and by acquiring the response to the second information from the control device as the second notification. The determination device then employs the second determination section to determine the control device to be in a normal state in a case in which second notification acquired is the control device normal notification.

The determination device of the first aspect initially performs communication that does not conform to the firewall rule in order to ascertain that the control device is malfunctioning if a communication with security issues is actually determined to be normal. The determination device next performs communication conforming to the firewall rules in order to ascertain that the control device is malfunctioning if a communication with no security issues is actually determined to be abnormal. In this manner, the determination device is capable of excluding false detections arising from the control device malfunctioning in a case in which attack information relating to security attacks is gathered from the control device that is protecting security using a firewall.

The determination device of a second aspect is the determination device of the first aspect, further including an acquisition section configured to acquire, from the control device, attack information with respect to communication received by the control device. The acquisition section acquires the attack information in a case in which the control device has been determined to be in a normal state by the second determination section.

In the determination device of the second aspect, the attack information is only acquired from the control device after determination that the control device is not malfunctioning, thereby excluding attack information misdetected due to malfunctioning. The determination device is thereby able to reduce the volume of information to acquire from the control device when diagnosing the control device, enabling the diagnosis time to be made shorter.

A determination device of a third aspect is the determination device of the second aspect, wherein, in a case in which the control device has been determined to be in a malfunction state by the first determination section and the attack information has already been acquired, the acquisition section discards the attack information being acquired.

The determination device of the third aspect enables attack information accompanying false detections to be excluded from the diagnosis of the control device by discarding attack information that is attack information acquired even though the control device was actually malfunctioning.

A fourth aspect is a determination system including the determination device of any one aspect from the first to the third aspect and the control device employed to control the vehicle. In the fourth aspect the control device includes a diagnosis section, a conformity determination section, and a notification section. The diagnosis section is configured to perform diagnosis on the control device in a case in which there is no compromise to safety of the vehicle. The conformity determination section is configured to determine whether or not either the first information or the second information received from the communication section in the diagnosis by the diagnosis section conforms to the rule. The notification section is configured to notify the determination device with the normal notification in a case in which the conformity determination section has determined conformity to the rule, and notify the determination device with the abnormal notification in a case in which the conformity determination section has determined non-conformity to the rule.

In the determination system of the fourth aspect, the diagnosis section in the control device starts the diagnosis in cases in which there is no compromise to safety of the vehicle, the conformity determination section determines whether or not the information from the determination device conforms to the firewall rule, and the notification section notifies the determination device according to the determination result thereof. As described above, in cases in which a determination device determines malfunction using communication not conforming to firewall rules in the control device, this leads to concerns that vulnerabilities might be introduced into the security of the control device when gathering attack information. However, this determination system enables the travel safety of the vehicle to be secured by gathering attack information only in cases in which there is no compromise to the safety of the vehicle.

A fifth aspect is a non-transitory storage medium storing a program to determine whether or not a control device installed in a vehicle is malfunctioning by performing communication with the control device. The program causes a computer to execute processing including: a first sending processing of sending first information to the control device, the first information not conforming to a rule of a firewall of the control device; a first determination processing of, when a response by the control device to the first information has been acquired from the control device as a first notification, determining the control device to be in a malfunction state in a case in which the first notification is a normal notification indicating that the control device is a normal state, and determining the control device to be in a normal state in a case in which the first notification is an abnormal notification indicating the control device is in an abnormal state; a second sending processing of additionally sending, to the control device, second information conforming to the rule in a case in which the control device has been determined to be in a normal state by the first determination processing; and a second determination processing of, when a response by the control device to the second information has been acquired from the control device as a second notification, determining the control device to be in a normal state in a case in which the second notification is the normal notification.

The non-transitory storage medium of the fifth aspect is storing the program. The program may be installed on a computer performing communication with the control device installed in a vehicle. The program initially causes the computer to perform communication that does not conform to the firewall rule in the control device in order to ascertain that the control device is malfunctioning if a communication with security issues is actually determined to be normal. The program causes the computer to next perform communication conforming to the firewall rule in the control device in order to ascertain that the control device is malfunctioning if a communication with no security issues is actually determined to be abnormal. In this manner, the program is capable of excluding false detections arising from a control device malfunctioning in a case in which attack information relating to security attacks is gathered from the control device that is protecting security using a firewall.

A sixth aspect is a determination method to determine whether or not a control device installed in a vehicle is malfunctioning by communicating with the control device and with a determination device connected to the control device. The determination method includes: a request processing in which the determination device requests the control device to perform diagnosis on the control device; a start processing in which the diagnosis is started in a case in which the control device has received the diagnosis request and there is no compromise to safety of the vehicle; a first sending processing following the start processing, in which first information not conforming to a rule of a firewall of the control device is sent from the determination device toward the control device; a first response processing in which the control device that has received the first information determines that the control device is in either a normal state or an abnormal state, and responds to the determination device; a first determination processing in which the control device is determined to be in a malfunction state in a case in which a first notification acquired by the determination device and corresponding to the first response processing is a normal notification indicating that the control device is in a normal state, and the control device is determined to be in a normal state in a case in which the first notification is an abnormal notification indicating the control device to be in an abnormal state; a second send processing in which second information conforming to the rule is additionally sent from the determination device toward the control device in a case in which the control device has been determined to be in a normal state by the first determination processing; a second response processing in which the control device that has received the second information determines the control device to be in either a normal state or an abnormal state, and responds to the determination device; and a second determination processing in which the control device is determined to be in a normal state in a case in which a second notification acquired by the determination device and corresponding to the second response processing is the normal notification.

In the determination method of the sixth aspect, the determination device determines whether or not the control device installed in a vehicle is malfunctioning by communicating with the control device. In the determination method the determination device initially communicates with the control device using communication not conforming to the firewall rule so as to thereby ascertain the control device to be malfunctioning if a communication with security issues is actually determined to be normal. Then the determination device next performs communication with the control device conforming to the firewall rule in order to ascertain that the control device is malfunctioning if a communication with no security issues is actually determined to be abnormal. In the determination method, the diagnosis on the control device is started only in cases in which there is no compromise to the safety of the vehicle, and then communication not conforming to the firewall rule is performed between the determination device and the control device. The determination method is capable of excluding false detections arising from a control device malfunctioning in a case in which attack information relating to security attacks is gathered from the control device that is protecting security using a firewall. Moreover, the travel safety of the vehicle can be secured due to being able to limit the gathering of attack information to cases in which there is no compromise to the safety of the vehicle.

The present disclosure enables exclusion of false detections arising from the malfunctioning of a control device, which is protecting security using a firewall, in cases in which attack information relating to security attacks is acquired from the control device.

BRIEF DESCRIPTION OF THE DRAWINGS

Exemplary embodiments of the present disclosure will be described in detail based on the following figures, wherein:

FIG. 7 is a flowchart (continued from FIG. 6) illustrating a flow of information provision processing executed by a DCM and information gathering processing executed by a central server in the first exemplary embodiment.

DETAILED DESCRIPTION

First Exemplary Embodiment

Figure 1:
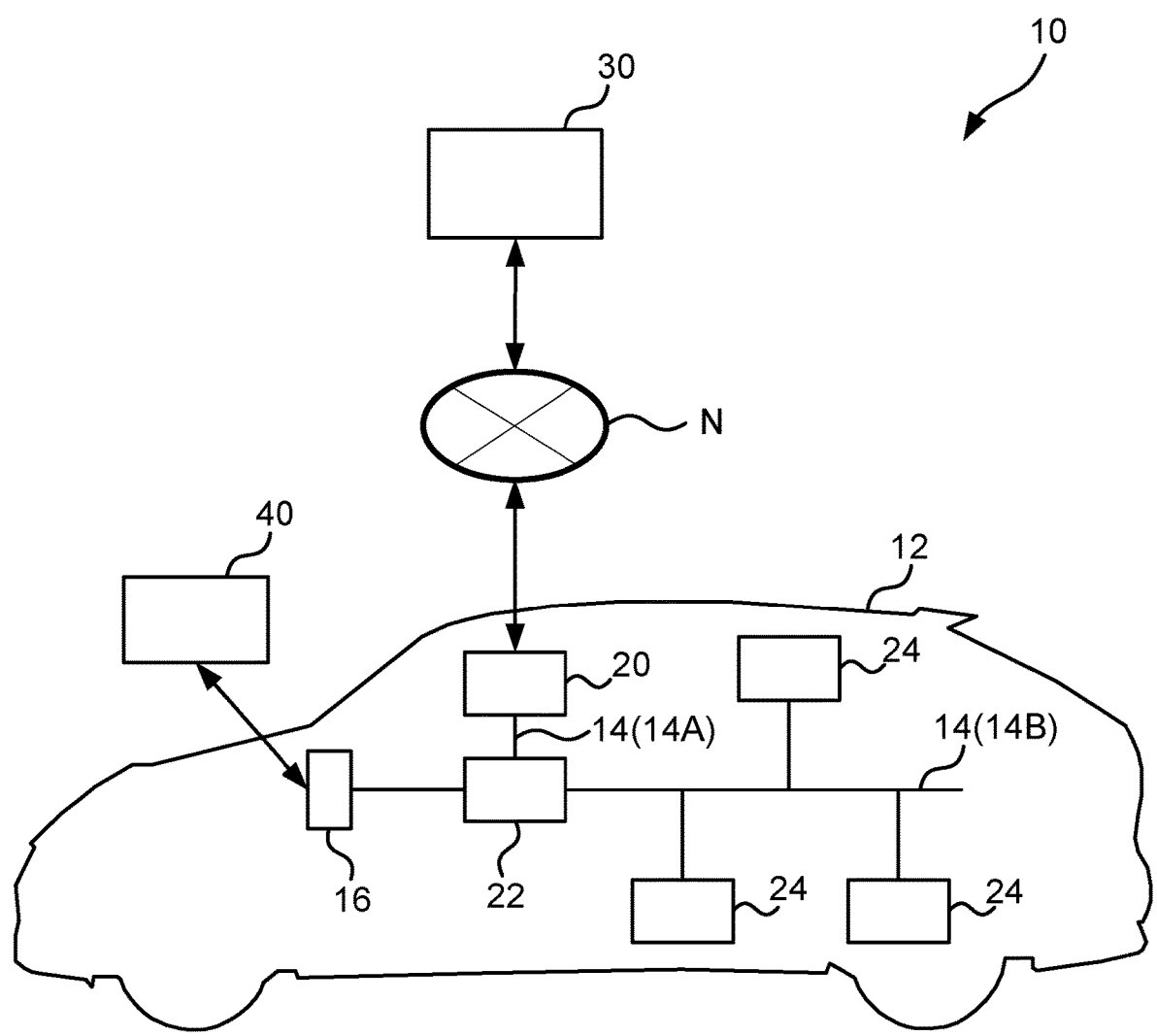
FIG. 1 is a diagram illustrating a schematic configuration of a determination system according to a first exemplary embodiment.

FIG. 1 is a block diagram illustrating a schematic configuration of a determination system 10 according to a first exemplary embodiment.

Outline

As illustrated in FIG. 1, the determination system 10 according to the first exemplary embodiment is configured including a vehicle 12, a central server 30 serving as a determination device, and a vehicle diagnostic unit 40.

The vehicle 12 of the present exemplary embodiment includes a data communication module (DCM) 20, a central gateway (GW) 22, and plural electronic control units (ECUs) 24. the DCM 20 is an example of a control device.

The DCM 20 is connected to the central server 30 through a network N configuring a communications network.

The central GW 22 is connected to the DCM 20 and the respective ECUs 24 through external buses (communication buses) 14. The external buses 14 include a first bus 14A connecting the central GW 22 and the DCM 20 together, and a second bus 14B connecting the central GW 22 and the respective ECUs 24 together. The external buses 14 perform communication using a controller area network (CAN) protocol.

The ECUs 24 are devices required to control the vehicle 12 and to control accessories installed in the vehicle 12. For example, the ECUs 24 include a body ECU, an engine ECU, a transmission ECU, a meter ECU, a multimedia ECU, a smart key ECU, and the like.

The central GW 22 is connected to a connector (data link connector (DLC)) 16. The vehicle diagnostic unit 40, serving as a diagnostic tool, can be connected to the connector 16.

DCM

Figure 2:
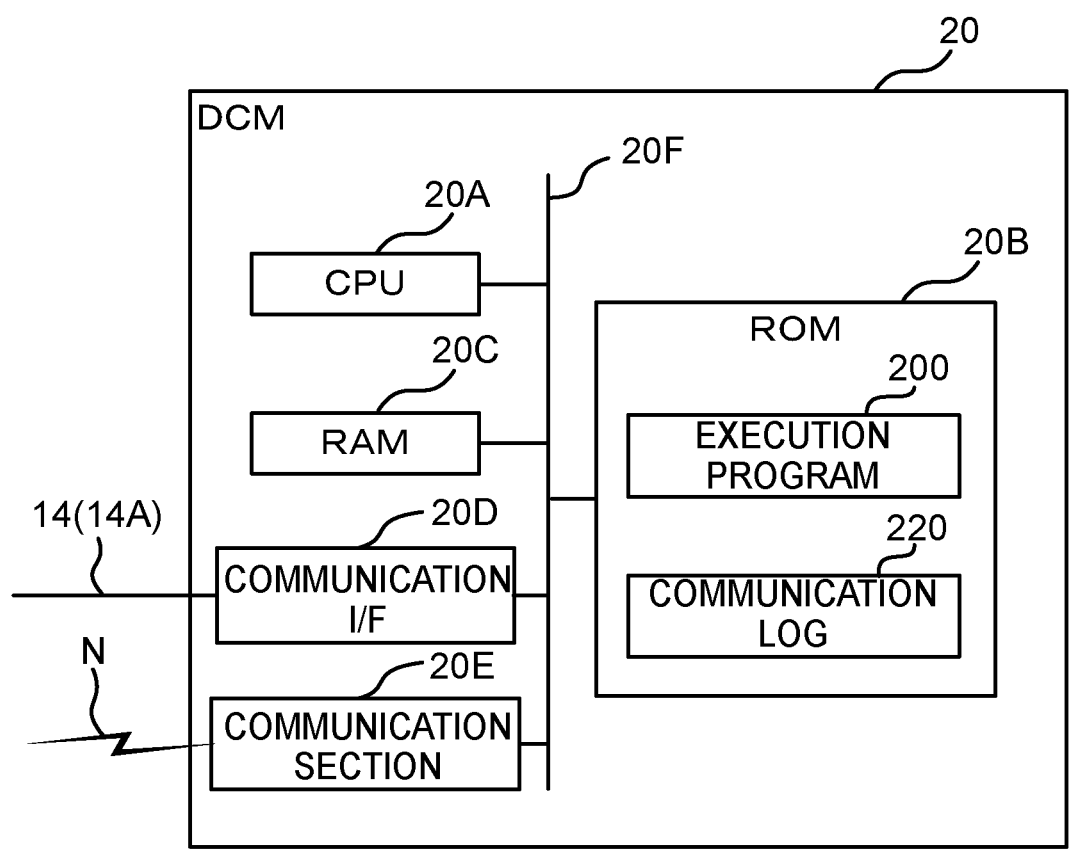
FIG. 2 is a block diagram illustrating a hardware configuration of a data communication module (DCM) of the first exemplary embodiment.

As illustrated in FIG. 2, the DCM 20 is configured including a central processing unit (CPU) 20A, read only memory (ROM) 20B, random access memory (RAM) 20C, a communication interface (I/F) 20D, and a communication section 20E. The CPU 20A, the ROM 20B, the RAM 20C, the communication I/F 20D, and the communication section 20E are connected together so as to be capable of communication with each other through an internal bus 20F. The CPU 20A is an example of a second processor, and the RAM 20C is an example of second memory.

The CPU 20A is a central processing unit that executes various programs, and controls the various sections. Namely, the CPU 20A reads a program from the ROM 20B, and executes the program using the RAM 20C as a workspace.

The ROM 20B is stored with various programs and various data. In the present exemplary embodiment, an execution program 200 is stored in the ROM 20B. The execution program 200 is a program used to perform information provision processing, described later. A communication log 220 is also stored in the ROM 20B. The communication log 220 includes "attack information", this being information stored when an abnormality arises in authentication processing caused by a security attack such as unauthorized access or the like to the communication section 20E. The RAM 20C serves as a workspace to temporarily store programs or data.

The communication I/F 20D is an interface used to connect the central GW 22 to the other ECUs 24. A CAN protocol is employed as the communication standard for this interface. The communication I/F 20D is connected to the first bus 14A.

The communication section 20E is a wireless communication module used for connecting to the central server 30. For example, 4G, LTE, or the like is employed as the communication standard for this wireless communication module. The communication section 20E is connected to the network N.

Figure 3:
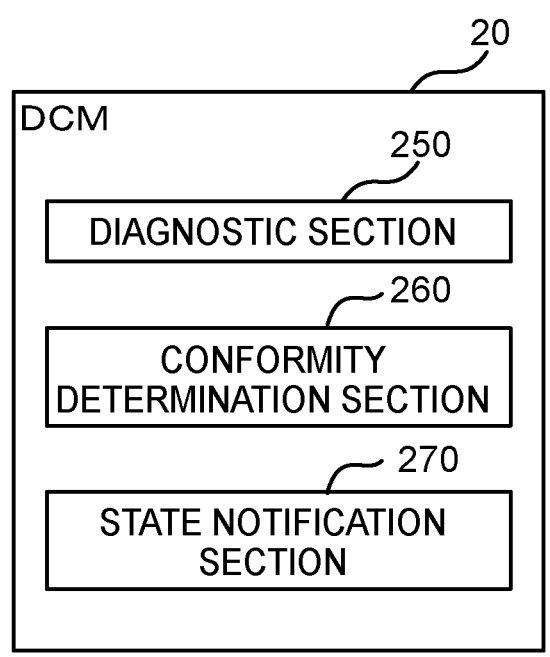
FIG. 3 is a block diagram illustrating an example of a functional configuration of a DCM of the first exemplary embodiment.

FIG. 3 is a block diagram illustrating an example of a functional configuration of the DCM 20. As illustrated in FIG. 3, the DCM 20 includes a diagnostic section 250, a conformity determination section 260, and a state notification section 270. These functional configuration units are implemented by the CPU 20A reading the execution program 200 stored in the ROM 20B, and executing the execution program 200.

The diagnostic section 250 includes functionality for executing a test mode to diagnose whether or not the DCM 20 is normal. On receipt of a test mode start request from the central server 30, the diagnostic section 250 transitions to the test mode in cases in which this does not compromise safety of the vehicle 12. In the present exemplary embodiment, "not compromising safety of the vehicle 12" indicates that the vehicle 12 is at a location where security of communication is secured and the vehicle 12 is stationary. Whether or not the vehicle 12 is stationary can be determined based on vehicle speed information and/or parking information.

Examples of a "location where security of communication is secured" include a location where communication can be restricted and security attacks such as unauthorized access and the like are not liable to occur such as, for example, a dealership workshop facility, or a home garage. When the test mode is started, the diagnostic section 250 performs control to prevent the vehicle 12 installed with the DCM 20 from traveling. For example, the diagnostic section 250 stops the ECUs 24 from functioning, prohibits engine startup, prohibits brake release, or the like so as to render the vehicle 12 incapable of traveling.

The conformity determination section 260 includes functionality to determine whether or not information received from the central server 30 conforms to the rules of a firewall of the DCM 20. The conformity determination section 260 in the present exemplary embodiment determines whether or not the information received from the central server 30 conforms to the firewall rules in cases in which a transition to the test mode is being made.

The state notification section 270, serving as a notification section, includes functionality to notify the central server 30 of a state of the DCM 20, as determined by the DCM 20 itself. The state notification section 270 transmits a normal notification to the central server 30 to indicate that the state of the DCM 20 is normal in cases in which information received from the central server 30 has been determined to conform to the firewall rules by the conformity determination section 260. The state notification section 270 transmits an abnormal notification to the central server 30 to indicate that the state of the DCM 20 is abnormal in cases in which the information received from the central server 30 has been determined by the conformity determination section 260 as not conforming to the firewall rules.

Note that within the information received from the central server 30 there is both non-conforming information and conforming information, as described later. When non-conforming information has been received from the central server 30, the state notification section 270 of the present exemplary embodiment transmits, as a first notification, either a normal notification or an abnormal notification to the central server 30. When conforming information has been received from the central server 30, the state notification section 270 also transmits, in this case as a second notification, either a normal notification or an abnormal notification to the central server 30.

Central Server

Figure 4:
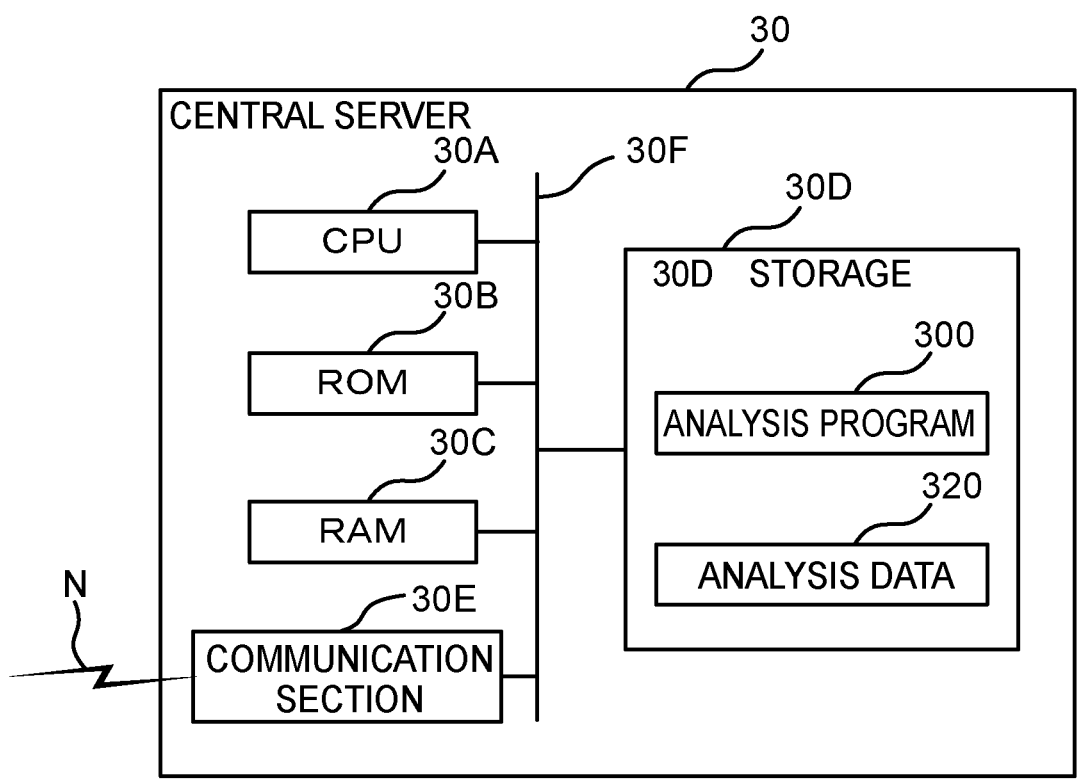
FIG. 4 is a block diagram illustrating a hardware configuration of a central server of the first exemplary embodiment.

FIG. 4 is a block diagram illustrating a hardware configuration of equipment installed in the central server 30 of the present exemplary embodiment.

The central server 30 is configured including a CPU 30A, ROM 30B, RAM 30C, storage 30D, and a communication section 30E. The CPU 30A, the ROM 30B, the RAM 30C, the storage 30D, and the communication section 30E are connected together through an internal bus 30F so as to be capable of communicating with each other. Functionality of the CPU 30A, the ROM 30B, the RAM 30C, and the communication section 30E is substantially the same as that of the CPU 20A, the ROM 20B, the RAM 20C, and the communication section 20E of the DCM 20 described above. The CPU 30A is an example of a first processor, and the RAM 30C is an example of first memory.

The storage 30D is configured by a hard disk drive (HDD) or a solid state drive (SSD). The storage 30D of the present exemplary embodiment is stored with an analysis program 300 and analysis data 320. The analysis program 300 is a program for performing information gathering processing, described later. The analysis data 320 is data compiled from attack information gathered from the DCM 20 as a result of the information gathering processing.

The CPU 30A of the present exemplary embodiment reads the analysis program 300 from the ROM 30B, and executes the analysis program 300 using the RAM 30C as a workspace. The CPU 30A executing the analysis program 300 causes the central server 30 to function as a non-conforming information send section 350, a conforming information send section 360, a primary determination section 370, a secondary determination section 380, and an information acquisition section 390, as illustrated in FIG. 5.

Figure 5:
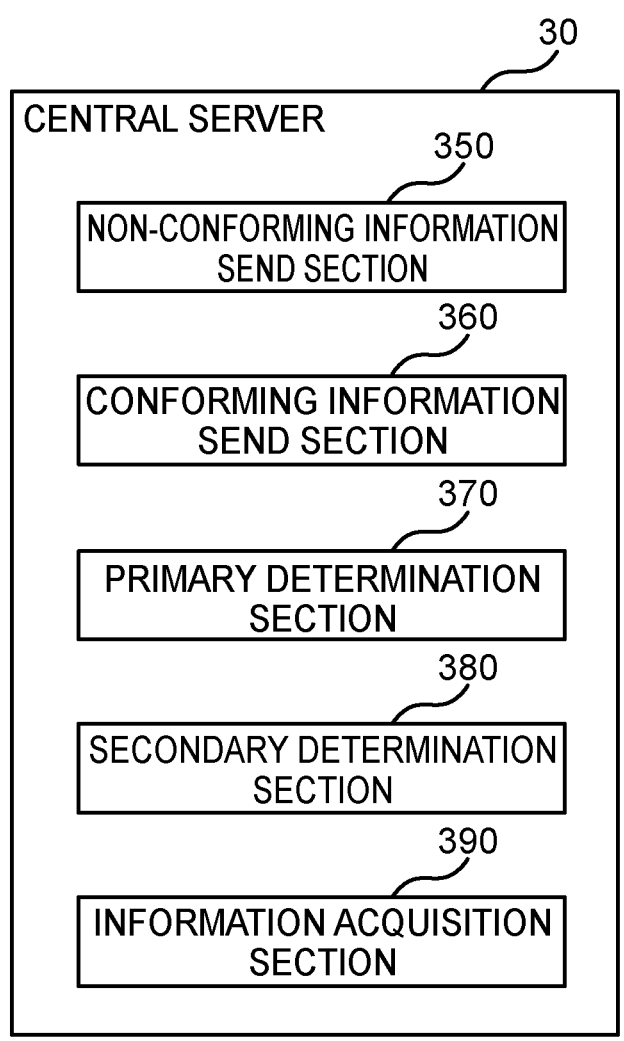
FIG. 5 is a block diagram illustrating an example of functional configuration of a central server of the first exemplary embodiment.

FIG. 5 is a block diagram illustrating an example of a functional configuration of the central server 30. As illustrated in FIG. 5, the central server 30 includes the non-conforming information send section 350, the conforming information send section 360, the primary determination section 370, the secondary determination section 380, and the information acquisition section 390.

The non-conforming information send section 350 serves as a first send section, and includes functionality to send to the DCM 20 non-conforming information, which does not conform to the firewall rules of the DCM 20. The non-conforming information is an example of first information.

The conforming information send section 360 serves as a second send section, and includes functionality to send to the DCM 20 conforming information, which conforms to the firewall rules of the DCM 20. The conforming information is an example of second information. The conforming information send section 360 sends the conforming information to the DCM 20 in cases in which the DCM 20 has been determined to be normal by the primary determination section 370, as described later.

The primary determination section 370 serves as a first determination section, and includes functionality to determine whether or not the DCM 20 is normal when the first notification has been acquired as a response by the DCM 20 to the non-conforming information transmitted to the DCM 20. The primary determination section 370 determines the DCM 20 to be malfunctioning in cases in which the first notification received is a normal notification, and determines the DCM 20 to be normal in cases in which the first notification is an abnormal notification.

The secondary determination section 380 serves as a second determination section, and includes functionality to determine whether or not the DCM 20 is normal when the second notification has been acquired as the response by the DCM 20 to the conforming information transmitted to the DCM 20. The secondary determination section 380 determines the DCM 20 to be normal in cases in which the second notification received is a normal notification, and determines the DCM 20 to be malfunctioning in cases in which the second notification is an abnormal notification.

The information acquisition section 390 serves as an acquisition section, and includes functionality to acquire attack information from the DCM 20 with respect to communication received by the communication section 20E of the DCM 20, and functionality to discard attack information that has already been acquired. In cases in which the DCM 20 has been determined to be normal by the secondary determination section 380, the information acquisition section 390 acquires attack information received from the DCM 20. In cases in which the DCM 20 has been determined to be malfunctioning by the primary determination section 370, the information acquisition section 390 discards acquired attack information in cases in which the attack information is already acquired.

Control Flow

Figure 6:
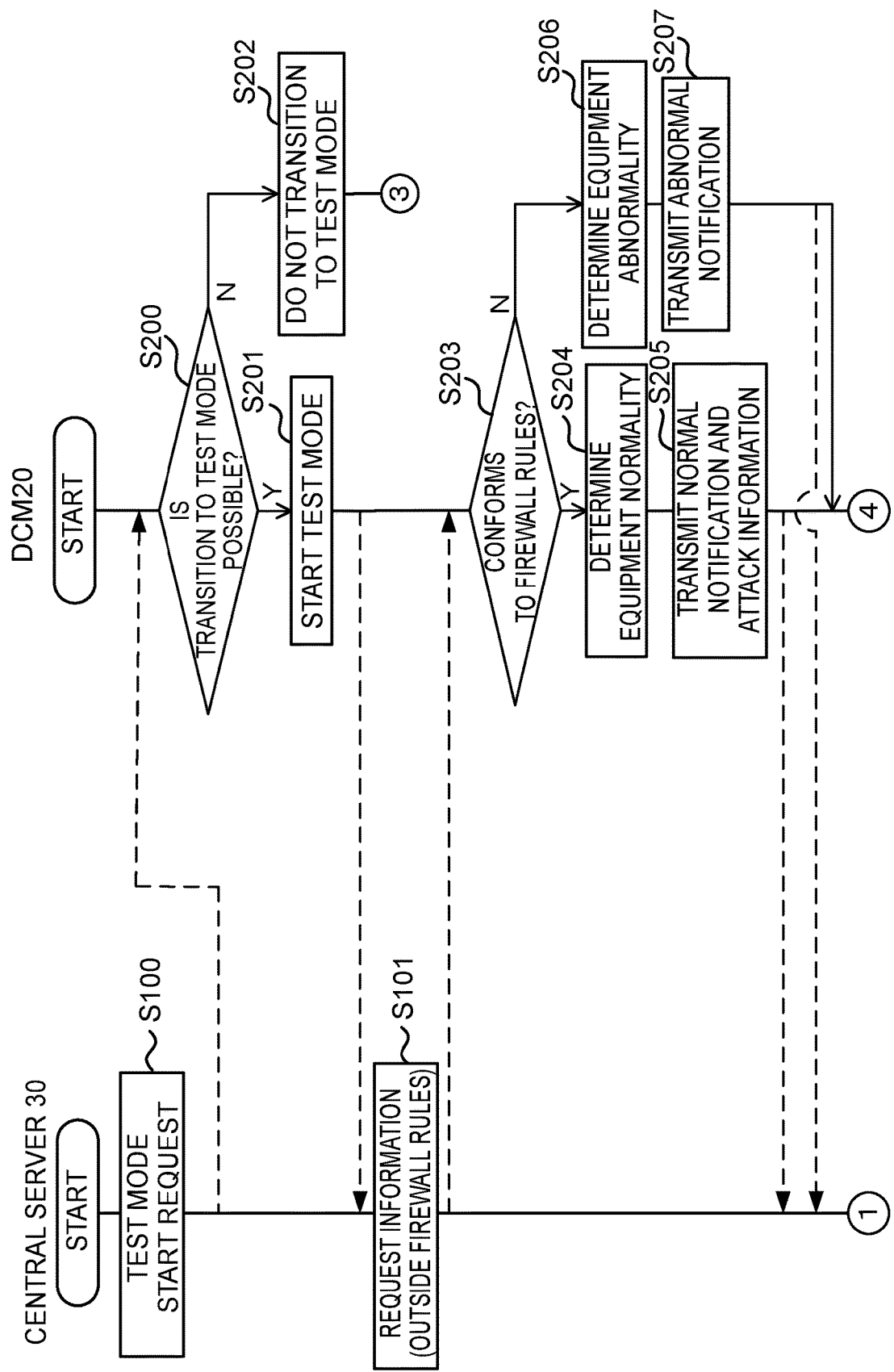
FIG. 6 is a flowchart illustrating a flow of information provision processing executed by a DCM and information gathering processing executed by a central server in the first exemplary embodiment.

Explanation follows regarding an example of a flow of information provision processing executed by the DCM 20 and of information gathering processing executed by the central server 30 in the present exemplary embodiment, with reference to the flowcharts of FIG. 6 and FIG. 7.

First, before the information provision processing is executed, the DCM 20 is storing attack information in the communication log 220 in cases in which there has been unauthorized access or the like to the DCM 20. The following processing is executed by the DCM 20 and the central server 30 when there is a need for such attack information to be analyzed by the central server 30.

As illustrated in FIG. 6, the central server 30 issues a test mode start request to the DCM 20 whose attack information is to be acquired (S100). More specifically, the central server 30 transmits a command to start the test mode to the DCM 20.

In response, the DCM 20 determines whether or not transition to the test mode is possible (S200). Specifically, the DCM 20 determines transition to the test mode to be possible in cases in which the vehicle 12 is stationary and the position information for the vehicle 12 indicates being at a location where security attacks such as unauthorized access are not liable to occur, for example a dealership workshop facility, or a home garage. The DCM 20 then starts the test mode (S201) in cases in which transition to the test mode is determined to be possible (YES at S200). To accompany starting the test mode, the DCM 20 also transmits a command indicating that the test mode has been started toward the central server 30.

However, in cases in which in the above determination a transition to the test mode is determined not to be possible (NO at S200), the DCM 20 ends the information provision processing without transitioning to the test mode (S202).

When the command indicating that the test mode has been started has been received from the DCM 20, the central server 30 uses communication that does not fall within a rule of the firewall (FW) to request information from the DCM 20 (S101). Specifically, the central server 30 transmits to the DCM 20 non-conforming information not conforming to the firewall rules.

When the DCM 20 has received the non-conforming information from the central server 30, the DCM 20 determines whether or not the received information conforms to the firewall rules (S203). The DCM 20 determines equipment normality (S204) for cases in which determination has been made that the received information conforms to the firewall rules (YES at S203). The DCM 20 then transmits a normal notification indicating that the DCM 20 is normal to the central server 30 together with the attack information (S205).

However, in cases in which the above determination is determination that the received information does not conform to the firewall rules (NO at S203), the DCM 20 determines an equipment abnormality (S206). The DCM 20 then transmits an abnormal notification indicating that the DCM 20 is abnormal to the central server 30 (S207).

As illustrated in FIG. 7, next the central server 30 determines whether or not an abnormal notification has been received from the DCM 20 (S102). The central server 30 determines equipment normality (S103) in cases in which determination is made that an abnormal notification has been received from the DCM 20 (YES at S102). The central server 30 then uses communication falling within the rules of the firewall (FW) to request information from the DCM 20 (S104). Specifically, the central server 30 transmits the conforming information that conforms to the firewall rules to the DCM 20.

However, in cases in which the above determination is determination that no abnormal notification has been received from the DCM 20, namely cases in which a normal notification has been received from the DCM 20 (NO at S102), the central server 30 determines that there is an equipment malfunction (S105). The central server 30 then discards the attack information received together with the normal notification (S106), and ends the information gathering processing.

In cases in which the DCM 20 has received conforming information from the central server 30, the DCM 20 determines whether or not the received information conforms to the firewall rules (S208). The DCM 20 determines equipment normality (S209) in cases in which determination of conformity to the firewall rules has been made (YES at S208). The DCM 20 then transmits a normal notification indicating that the DCM 20 is normal to the central server 30 together with the attack information (S210).

However, in cases in which the above determination is determination that there is no conformity to the firewall rules (NO at S208), the DCM 20 determines an equipment abnormality (S211). The DCM 20 then transmits an abnormal notification indicating that the DCM 20 is abnormal to the central server 30 (S212).

After transmitting a normal notification or an abnormal notification to the central server 30, the DCM 20 ends the test mode (S213), and ends the information provision processing.

Next, the central server 30 determines whether or not a normal notification has been received from the DCM 20 (S107). The central server 30 determines equipment normality (S108) in cases in which determination is made that a normal notification has been received from the DCM 20

(YES at S107). The central server 30 then acquires the received attack information (S109), and ends the information gathering processing.

However, in cases in which the above determination is determination that a normal notification has not been received from the DCM 20, namely is determination that an abnormal notification has been received (NO at S107), the central server 30 determines equipment malfunction (S110). The central server 30 then ends the information gathering processing.

Summary of First Exemplary Embodiment

In the present exemplary embodiment, the central server 30 initially performs communication with the DCM 20 that does not conform to the firewall rules in order to ascertain that the DCM 20 is malfunctioning if a communication with security issues is actually determined to be normal. The central server 30 then performs communication with the DCM 20 that conforms to the firewall rules in order to ascertain that the DCM 20 is malfunctioning if a communication with no security issues is actually determined to be abnormal. In this manner, the present exemplary embodiment is capable of excluding false detections arising from the DCM 20 malfunctioning in cases in which attack information relating to security attacks is gathered from the DCM 20 that is protecting security using a firewall. This thereby enables a higher precision of analysis.

Note that there are many more patterns of conditions for communications that do not conform to the firewall rules than the limited conditions for communications that do conform to the firewall rules. Accordingly, in the present exemplary embodiment communication, pre-processing is performed for malfunction determination by ascertaining malfunction of the DCM 20 relative to a wide range of conditions by first using communications with many patterns. Namely, by initially performing communication not conforming to the firewall rules, in cases in which this leads to the DCM 20 being determined to be malfunctioning, the central server 30 does not then need to perform communication conforming to the firewall rules, and does not need to acquire attack information containing false detections. This enables a reduction to be achieved in the volume of information acquired from the DCM 20 during diagnosis of the DCM 20, thereby enabling the diagnosis time to be made shorter. Reducing the volume of information also enables a reduction in packet load to be achieved.

In the determination system 10 of the present exemplary embodiment, the diagnostic section 250 of the DCM 20 starts the test mode only when there is no compromise to the safety of the vehicle 12, and then the DCM 20 performs communication with the central server 30 not conforming to the firewall rules. In cases in which a malfunction is identified using communication not conforming to the firewall rules, this leads to concerns that vulnerabilities might be introduced into the security of the DCM 20. However, the present exemplary embodiment enables the travel safety of the vehicle 12 to be secured by gathering attack information only in cases in which there is no compromise to the safety of the vehicle 12.

Note that in cases in which, during execution of the test mode, the vehicle speed of the vehicle 12 rises from zero or the vehicle 12 moves away from the location where security of communication is secured, the diagnostic section 250 forcibly ends the test mode and restores the mode to the normal mode to allow the vehicle 12 to travel. By limiting situations in which a transition is made to the test mode, the present exemplary embodiment enables information to be gathered while maintaining a higher level of security.

The central server 30 of the present exemplary embodiment also enables attack information accompanying false detections to be excluded from the diagnosis of DCM 20 by discarding attack information that is attack information acquired even though the DCM 20 was actually malfunctioning.

Note that although in the present exemplary embodiment the DCM 20 transmits attack information to the central server 30 (S205, S210) when the DCM 20 has determined equipment normality itself, there is no limitation thereto. A configuration may be adopted in which the DCM 20 transmits attack information after the central server 30 has determined that the DCM 20 is not malfunctioning. For example, configuration may be made such that the central server 30 acquires the attack information by transmitting a request command to the DCM 20 requesting transmission of attack information after the DCM 20 has been determined to be normal by the secondary determination section 380.

In such cases, the central server 30 acquires the attack information from the DCM 20 only after the DCM 20 has been determined not to be malfunctioning. This accordingly enables attack information falsely detected due to malfunctioning to be completely excluded. This enables the volume of information acquired from the DCM 20 during diagnosis of the DCM 20 to be further reduced, thereby enabling the diagnosis time to be made shorter.

Second Exemplary Embodiment

In the first exemplary embodiment, the central server 30, serving as a determination device, acquires attack information in the DCM 20, serving as a control device. By contrast, in a second exemplary embodiment, the vehicle diagnostic unit 40 serves as a determination device, and the central GW 22 serves as a control device.

Hardware configuration and functional configuration of the central GW 22 of the present exemplary embodiment have a similar configuration to those of the DCM 20 of the first exemplary embodiment, excepting in that the communication section performs wired communication. Moreover, the hardware configuration and functional configuration of the vehicle diagnostic unit 40 of the present exemplary embodiment have a similar configuration to those of the central server 30 of the first exemplary embodiment, with the exception of the point that the communication section performs wired communication.

Accordingly, the vehicle diagnostic unit 40 of the present exemplary embodiment communicates with the central GW 22 and is thereby able to acquire attack information relating to security attacks such as unauthorized access or the like received by the central GW 22. When this is performed, the vehicle diagnostic unit 40 initially communicates with the central GW 22 using communication not conforming to the firewall rules of the central GW 22, and thereby ascertains the central GW 22 to be malfunctioning if a communication with security issues is actually determined to be normal. The vehicle diagnostic unit 40 then communicates with the central GW 22 using communication conforming to the firewall rules of the central GW 22, and thereby ascertains the central GW 22 to be malfunctioning if a communication with no security issues actually determined to be abnormal. The present exemplary embodiment as described above enables false detections due to the central GW 22 malfunctioning to be excluded in cases in which attack information relating to a security attack is gathered from the central GW 22 that is protecting security using a firewall.

Other operation and advantageous effects of the present exemplary embodiment are similar to those of the first exemplary embodiment.

Remarks

Note that the various processing executed by the CPU 20A reading software (a program) and the various processing executed by the CPU 30A reading software (a program) in the exemplary embodiments described above may be executed by various processors other than the CPUs. Examples of such processors include programmable logic devices (PLDs) that have circuit configurations that can be modified after manufacture, such as field-programmable gate arrays (FPGAs), or dedicated electrical circuits, these being processors such as application specific integrated circuits (ASICs) that have a custom designed circuit configuration to execute specific processing. The various processing may be executed using one of these processors, or may be executed by a combination of two or more processors of the same type or different types to each other (for example, a combination of plural FPGAs, or a combination of a CPU and an FPGA). A more specific example of a hardware structure of these various processors is electric circuitry combining circuit elements such as semiconductor elements.

The exemplary embodiments described above describe a mode in which a program is stored (installed) in advance in a non-transitory computer readable recording medium. For example, the execution program 200 in the DCM 20 of the vehicle 12 is stored in advance in the ROM 20B. The analysis program 300 of the central server 30 is stored in advance in the storage 30D. However, there is no limitation thereto, and the programs may be provided in a format recorded on a non-transitory recording medium such as compact disc read only memory (CD-ROM), digital versatile disc read only memory (DVD-ROM), or universal serial bus (USB) memory. Alternatively, the programs may be provided in a format downloadable from an external device over a network.

The flows of processing described in the exemplary embodiment described above merely examples thereof, and unnecessary steps may be omitted, new steps may be added, or the processing sequence may be rearranged within a range not departing from the spirit thereof

What is claimed is:

1. A determination device, comprising:
a communication section configured to communicate with a control device installed in a vehicle;
a first memory; and
a first processor coupled to the first memory, the first processor being configured to execute processing so as to:
send first information to the control device, the first information not conforming to a rule of a firewall of the control device,
execute first determination processing in which, when a response by the control device to the first information has been acquired from the control device as a first notification, the control device is determined to be in a malfunction state and the processor ends the processing in a case in which the first notification is a normal notification indicating that the control device is in a normal state, and the control device is determined to be in a normal state with respect to the first information and the processor continues the processing in a case in which the first notification is an abnormal notification indicating that the control device is in an abnormal state,
additionally send second information conforming to the rule to the control device determined to be in a normal state with respect to the first information in a case in which the control device has been determined to be in the normal state with respect to the first information by the first determination processing, and
execute second determination processing in which, when a response by the control device to the second information has been acquired from the control device as a second notification, the control device is determined to be in the malfunction state and the processor ends the processing in a case in which the second notification is the abnormal notification, and the control device is determined to be in a normal state and the processor ends the processing in a case in which the second notification is the normal notification.

2. The determination device of claim 1, wherein:
the first processor is configured to acquire, from the control device, attack information with respect to communication received by the control device; and
the first processor acquires the attack information in a case in which the control device has been determined to be in a normal state by the second determination processing.

3. The determination device of claim 2, wherein, in a case in which the control device has been determined to be in a malfunction state by the first determination processing and attack information has already been acquired, the first processor discards the attack information being acquired.

4. A determination system, comprising:
the determination device of claim 1; and
the control device employed to control the vehicle, wherein the control device includes
a second memory, and
a second processor coupled to the second memory, the second processor being configured to:
perform diagnosis on the control device in a case in which there is no compromise to safety of the vehicle,
in the diagnosis, determine whether or not either the first information or the second information received from the communication section conforms to the rule, and
notify the determination device with the normal notification in a case in which the received information has been determined to conform to the rule, and notify the determination device with the abnormal notification in a case in which the received information has been determined not to conform to the rule.

5. The determination system of claim 4, wherein the second processor is further configured to:
perform diagnosis on the control device in a case in which the vehicle is stationary; and
stop diagnosing the control device in a case in which the stationary vehicle has started to travel during the diagnosis of the control device.

6. A non-transitory storage medium storing a program to determine whether or not a control device installed in a vehicle is malfunctioning by performing communication with the control device, the program causing a computer to execute processing comprising:

a first sending processing of sending first information to the control device, the first information not conforming to a rule of a firewall of the control device;

a first determination processing of, when a response by the control device to the first information has been acquired from the control device as a first notification, determining the control device to be in a malfunction state and ending the processing in a case in which the first notification is a normal notification indicating that the control device is in a normal state, and determining the control device to be in a normal state with respect to the first information and continuing the processing in a case in which the first notification is an abnormal notification indicating that the control device is in an abnormal state;

a second sending processing of additionally sending, to the control device determined to be in the normal state with respect to the first information, second information conforming to the rule in a case in which the control device has been determined to be in the normal state with respect to the first information by the first determination processing; and a second determination processing of, when a response by the control device to the second information has been acquired from the control device as a second notification, determining that the control device is in the malfunction state and the ending the processing in a case in which the second notification is the abnormal notification, and determining the control device to be in a normal state and ending the processing in a case in which the second notification is the normal notification.

7. A determination method to determine whether or not a control device installed in a vehicle is malfunctioning by communicating with the control device and with a determination device connected to the control device, the determination method comprising executing processing that includes:

a request processing in which the determination device requests the control device to perform diagnosis on the control device;

a start processing in which the diagnosis is started in a case in which the control device has received the diagnosis request and there is no compromise to safety of the vehicle;

a first sending processing following the start processing, in which first information not conforming to a rule of a firewall of the control device is sent from the determination device to the control device;

a first response processing in which the control device that has received the first information determines that the control device is in either a normal state or an abnormal state, and responds to the determination device;

a first determination processing in which the control device is determined to be in a malfunction state and the processing is ended in a case in which a first notification acquired by the determination device and corresponding to the first response processing is a normal notification indicating that the control device is in a normal state, and the control device is determined to be in a normal state with respect to the first information and the processing is continued in a case in which the first notification is an abnormal notification indicating the control device to be in an abnormal state;

a second send processing in which second information conforming to the rule is additionally sent from the determination device to the control device in a case in which the control device has been determined to be in a normal state with respect to the first information by the first determination processing;

a second response processing in which the control device that has received the second information determines the control device to be in either a normal state or an abnormal state, and responds to the determination device; and a second determination processing in which the control device is determined to be in a normal state in a case in which a second notification acquired by the determination device and corresponding to the second response processing is the normal notification and ending the processing in a case in which the second notification is the normal notification.

* * * * *